United States Patent
Park et al.

(10) Patent No.: US 11,555,884 B2
(45) Date of Patent: Jan. 17, 2023

(54) ADVANCED METHOD FOR MITIGATING LEAKAGE SIGNAL IN FMCW RADAR AND RADAR SYSTEM THEREFOR

(71) Applicant: KOREA ADVANCED INSTITUTE OF SCIENCE AND TECHNOLOGY, Daejeon (KR)

(72) Inventors: SeongOok Park, Daejeon (KR); Junhyeong Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 238 days.

(21) Appl. No.: 16/924,452

(22) Filed: Jul. 9, 2020

(65) Prior Publication Data

US 2021/0109191 A1    Apr. 15, 2021

(30) Foreign Application Priority Data

Oct. 11, 2019  (KR) .......................... 10-2019-0126204

(51) Int. Cl.
| | |
|---|---|
| *G01S 13/34* | (2006.01) |
| *G01S 7/35* | (2006.01) |
| *H04B 1/525* | (2015.01) |
| *G01S 7/282* | (2006.01) |
| *G01S 13/36* | (2006.01) |
| *H04B 1/04* | (2006.01) |

(52) U.S. Cl.
CPC .............. *G01S 7/354* (2013.01); *G01S 7/282* (2013.01); *G01S 13/346* (2013.01); *G01S 13/36* (2013.01); *H04B 1/525* (2013.01); *G01S 7/356* (2021.05); *H04B 1/0475* (2013.01)

(58) Field of Classification Search
CPC ........ G01S 13/34; G01S 13/346; G01S 13/36; G01S 7/282; G01S 7/354; G01S 7/356; H04B 1/0475; H04B 1/525

See application file for complete search history.

(56) References Cited

U.S. PATENT DOCUMENTS

2018/0074168 A1* 3/2018 Subburaj ................. G01S 7/038

* cited by examiner

*Primary Examiner* — Timothy A Brainard
(74) *Attorney, Agent, or Firm* — Heslin Rothenberg Farley & Mesiti, P.C.

(57) ABSTRACT

A method for mitigating a leakage signal in an FMCW radar and a radar system thereof are disclosed. The method for mitigating the leakage signal in the radar system includes generating an in-phase signal and a quadrature signal for a beat signal, generating a complex signal using the in-phase signal and the quadrature signal, concentrating a phase noise of the leakage signal included in the complex signal on a stationary point, and mitigating the phase noise based on stationary point concentration (SPC) of the phase noise.

9 Claims, 11 Drawing Sheets

ADVANCED METHOD FOR MITIGATING LEAKAGE SIGNAL IN FMCW RADAR AND RADAR SYSTEM THEREFOR

CROSS REFERENCE TO RELATED APPLICATIONS

This application claims priority under 35 U.S.C. § 119 to Korean Patent Application No. 10-2019-0126204 filed on Oct. 11, 2019, which is incorporated herein by reference in its entirety.

BACKGROUND

Embodiments of the inventive concept described herein relate to technologies of mitigating a leakage signal in a frequency modulated continuous wave (FMCW) radar, and more particularly, relate to a method for mitigating a leakage signal to mitigate the leakage signal which is a unique problem generated in the FMCW radar to reduce a noise floor over an overall frequency domain and thus improve a signal to noise ratio (SNR) of a target signal and a radar system therefor.

An FMCW radar has been used for various purposes, for example, moving target detection, level meters, altimeters, biometric detection, weather prediction and analysis, and image detection as well as simple static target detection. The FMCW radar is superior to the pulse radar in terms of cost, maximum transmit power, and minimum detection range. However, signals leaked from a transmitter to a receiver have several bad influences on the FMCW radar. As a representative phenomenon the leakage signal causes, there is a phenomenon in which the SNR of the target signals is seriously reduced by increasing the noise floor over the overall frequency domain in the power spectrum result which is finally obtained. In this case, the cause of the noise floor which is increased over the overall frequency is the phase noise of the leakage signal. Thus, as the leakage signal itself is increased or as the phase noise of the leakage signal is not good, the SNR of the target signals is degraded. To mitigate the leakage signal to address it, there is a need for a technology for attenuating the leakage signal itself or mitigating the phase noise.

As an existing method, first of all, there is a method for configuring a large closed loop from a radio frequency (RF) stage to a base stage. The splitting coupler capable of splitting the transmit signal is put in the closed loop. The method is to adaptively extract the error vector for the amplitude and phase information of the leakage signal to compensate it, thus generating the phase opposite to the phase of the leakage signal and adding the generated signal to the leakage signal using the synthesizing coupler to mitigate the leakage signal itself. However, the method needs many additional components to configure the above-mentioned closed loop, so the additional costs according to it are incurred.

As another existing method, there is a stationary point concentration (SPC) technique. The SPC technique concentrates the phase noise of the leakage signal on the stationary point to considerably reduce the magnitude of the phase noise of the leakage signal indicated as voltage or current noise. As the phase noise of the leakage signal is mitigated, the noise floor is significantly reduced and the SNR of the target signals is improved. This method does not need additional hardware, but the strategic frequency planning and the oversampling are required and the structure of the FMCW radar capable of applying the technique is limited.

SUMMARY

Embodiments of the inventive concept provide a method for mitigating a leakage signal to mitigate the leakage signal which is a unique problem generated in an FMCW radar to reduce a noise floor over an overall frequency domain and thus improve an SNR of a target signal, and a radar system therefor.

Embodiments of the inventive concept provide a method for mitigating a leakage signal to effectively mitigate the leakage signal by improving a stationary point concentration (SPC) technique and a radar system therefor.

According to an exemplary embodiment, a method for mitigating a leakage signal in a radar system may include generating an in-phase signal and a quadrature signal for a beat signal, generating a complex signal using the in-phase signal and the quadrature signal, concentrating a phase noise of the leakage signal included in the complex signal on a stationary point, and mitigating the phase noise based on stationary point concentration (SPC) of the phase noise.

The concentrating may include concentrating the phase noise on the stationary point using an SPC technique of concentrating the phase noise of the leakage signal on a stationary point of the cosine function.

The concentrating may include concentrating the leakage signal on the stationary point by performing sampling to a minimum available sampling frequency according to the Nyquist sampling theorem, with regard to a maximum detection distance without the necessity of oversampling and strategic frequency planning.

The concentrating may include extracting a first signal from the complex signal by performing DC removal and in-phase/quadrature imbalance correction for the complex signal, obtaining a spectrum in the form of magnitude response after performing fast Fourier transform (FFT) accompanied with zero padding for the first signal and finding an index of the leakage signal as the beat signal using peak searching, extracting a beat frequency value of the leakage signal based on the index of the leakage signal, extracting a phase value of the leakage signal based on the index of the leakage signal, generating a digital numerically controlled oscillator (NCO) based on the beat frequency value and the phase value, and performing down-conversion of removing a beat frequency and a phase of the leakage signal by taking a complex conjugate to the digital NCO and multiplying the complex conjugate by the first signal.

According to an exemplary embodiment, a radar system for mitigating a leakage signal may include a first means that generates an in-phase signal and a quadrature signal for a beat signal, a second means that generates a complex signal using the in-phase signal and the quadrature signal and concentrates a phase noise of the leakage signal included in the complex signal on a stationary point, and a third means that mitigates the phase noise based on stationary point concentration (SPC) of the phase noise.

The second means may concentrate the phase noise on the stationary point using an SPC technique of concentrating the phase noise of the leakage signal on a stationary point of the cosine function.

The second means may concentrate the leakage signal on the stationary point by performing sampling to a minimum available sampling frequency according to the Nyquist sampling theorem, with regard to a maximum detection distance without the necessity of oversampling and strategic frequency planning.

The second means may extract a first signal from the complex signal by performing DC removal and in-phase/quadrature imbalance correction for the complex signal, may obtain a spectrum in the form of magnitude response after performing fast Fourier transform (FFT) accompanied with zero padding for the first signal and finds an index of the leakage signal as the beat signal using peak searching, may extract a beat frequency value of the leakage signal based on the index of the leakage signal and may extract a phase value of the leakage signal based on the index of the leakage signal, and may generate a digital NCO based on the beat frequency value and the phase value and may perform down-conversion of removing a beat frequency and a phase of the leakage signal by taking a complex conjugate to the digital NCO and multiplying the complex conjugate by the first signal.

According to an exemplary embodiment, a radar system for removing a beat frequency and a phase of a leakage signal as a beat signal may include a transmit (TX) radio frequency (RF) stage, a receive (RX) RF stage, a TX intermediate frequency (IF) stage, a mixer, an RX IF stage, first and second analog-to-digital converters (ADCs), and a leakage signal attenuation stage. The first and second ADCs may sample an in-phase signal and a quadrature signal for a beat signal output from the RX IF stage to a predetermined frequency. The leakage signal attenuation stage may generate a complex signal using the in-phase signal and the complex signal, may extract a first signal from the complex signal by performing DC removal and in-phase/quadrature imbalance correction for the complex signal, may extracts a beat frequency value and a phase value of the leakage signal as the beat signal, and may perform final down-conversion of generating a digital NCO having the extracted beat frequency value and the extracted phase value and multiplying the digital NCO by the first signal.

The leakage signal attenuation stage may obtain a spectrum in the form of magnitude response after performing fast Fourier transform (FFT) accompanied with zero padding for the first signal and may find an index of the leakage signal as the beat signal using peak searching, may extract the beat frequency value of the leakage signal based on the index of the leakage signal and may extract the phase value of the leakage signal based on the index of the leakage signal, and may generate the digital NCO based on the beat frequency value and the phase value and may down-conversion of removing a beat frequency and a phase of the leakage signal by taking a complex conjugate to the digital NCO and multiplying the complex conjugate by the first signal.

The mixer may provide the RX IF stage with an in-phase beat signal and a quadrature beat signal by including an in-phase mixer and a quadrature mixer and performing quadrature demodulation.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
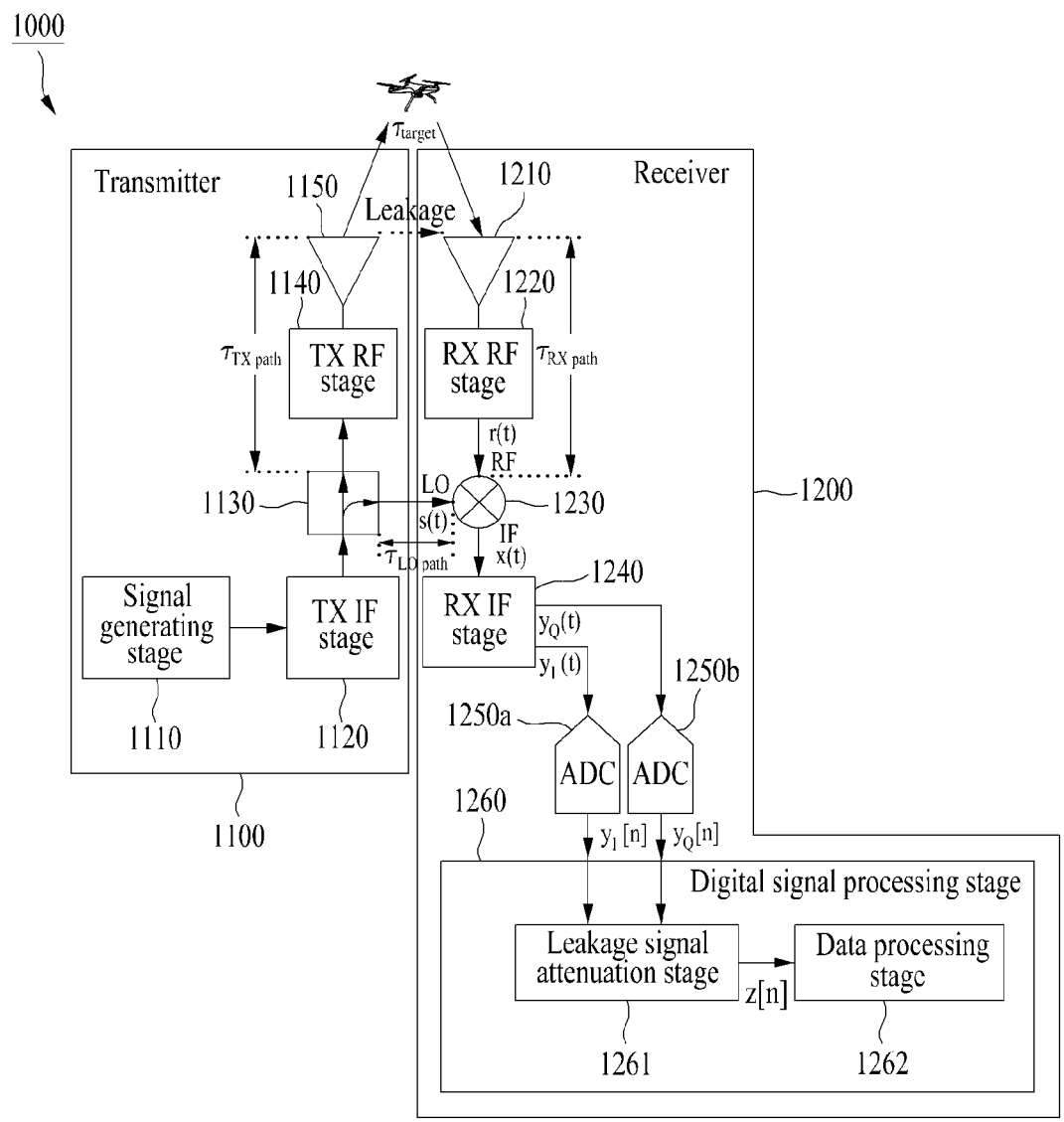
FIG. 1 is a drawing illustrating a configuration of an FMCW radar system according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

Embodiments of the inventive concept may be the gist of mitigating a leakage signal which is a unique problem which occurs in an FMCW radar to reduce a noise floor in a power spectrum over the overall frequency domain, and thus improving an SNR of a target signal.

Herein, because an embodiment of the inventive concept does not need strategic frequency planning and oversampling required in a stationary point concentration (SPC) technique, it may be free in frequency planning and may save sampling frequency resources. When performing sampling to the same extent as an oversampling frequency required in the SPC technique, an embodiment of the inventive concept may ensure a maximum unambiguous range over two times.

Signals via the RX antenna 1210 may down-converted into an IF band via an RX RF stage 1220 including a low noise amplifier (LNA), an isolator, an LO, a mixer, a filter, a cable, or the like and may be input to an RF port of the mixer 1230 for beat signal generation. Signals received from the RX antenna 1210 to the RF port of the mixer 1230 for beat signal generation may be delayed by $\tau_{RX\,path}$.

Thus, RX signals input to the RF port of the mixer 1230 for beat signal generation may be represented as Equation 2 below when considering Equation 1 above.

$$r(t) = \underbrace{A_L \cos(2\pi f_{RX}(t - \tau_{RX\,path}) + \pi\alpha(t - \tau_{TX\,path} - \tau_{RX\,path})^2 + \theta_L + \varphi_L(t))}_{\text{Leakage}} + \quad \text{[Equation 2]}$$

$$\underbrace{\sum_{k=1}^{K} A_{T,k} \cos(2\pi f_{RX}(t - \tau_{RX\,path}) + \pi\alpha(t - \tau_{TX\,path} - \tau_{RX\,path} - \tau_{T,k})^2 + \theta_{T,k} + \varphi_{T,k}(t)) \cdot \kappa}_{\text{Targets}}$$

FIG. 1 is a drawing illustrating a configuration of an FMCW radar system according to an embodiment of the inventive concept, which illustrates a configuration of an FMCW radar system to which a method according to an embodiment of the inventive concept (hereinafter referred to as "advanced stationary point concentration (A-SPC) technique") for improving an SPC technique is applied.

Referring to FIG. 1, a radar system 1000 according to an embodiment of the inventive concept may include a transmitter 1100 and a receiver 1200.

A linear frequency modulation (LFM) signal generated by a signal generating stage 1110 (or a signal generator) of the transmitter 1100 may be split by a splitter 1130 via a transmit (TX) IF stage 1120 including an amplifier, a filter, a mixer, a local oscillator (LO), an isolator, or the like. One of the two outputs split by the splitter 1130 may be input to a TX RF stage 1140, and the other may be a reference FMCW signal, which may be input to a mixer 1230 for beat signal generation in the receiver 1200.

In this case, the reference FMCW signal may be represented as Equation 1 below at an LO port of the mixer 1230 for beat signal generation.

$$s(t) = A_S \cos(2\pi f_{TX}(t - \tau_{LO\,path}) + \pi\alpha(t - \tau_{LO\,path})^2 + \theta_S + \varphi_S(t - \tau_{LO\,path})), \text{ for } 0 < t < T. \quad \text{[Equation 1]}$$

Herein, $A_S$ and $f_{TX}$ denote the amplitude and the start frequency of the reference FMCW signal, $\alpha = BW/T$ denotes the slope, BW and T denote the sweep bandwidth and the sweep period, $\theta_S$ and $\varphi_S(t)$ denote the phase and the phase noise, $\tau_{LO\,path}$ denotes the delay from the splitter 1130 to the LO port of the mixer 1230 for beat signal generation, and $\tau_{LO\,path}$ is considered together with other delays at an RF port.

The other of the outputs of the splitter 1130 may be up-converted into an RF band via the TX RF stage 1140 including a cable, an LO, a mixer, a filter, an isolator, a power amplifier, or the like and may be emitted via a TX antenna 1150.

Thus, the delay is given by $\tau_{TX\,path}$ from the splitter 1130 to the TX antenna 1150. The emitted electromagnetic wave may immediately leak to a receive (RX) antenna 1210 and may be received by the RX antenna 1210 of the receiver 1200 together with electromagnetic waves delayed by the round trip delay $\tau_{T,k}$, which is reflected from several targets, for example, k targets, and return again.

Herein, $A_L$ and $A_{T,k}$, $\theta_R$ and $\theta_{T,k}$, and $\varphi_L(t)$ and $\varphi_{T,k}(t)$ denote the amplitudes, the phases, and the phase noises of the leaked LFM signal and the LFM signals reflected by the targets, respectively, and $f_{RX}$ denotes the start frequency of the LFM signals received from the down-conversion.

The phase noise $\varphi_L(t)$ of the leaked LFM signal and the phase noise $\varphi_{T,k}(t)$ of the LFM signals reflected by the targets may be represented as Equation 3 below and Equation 4 below.

$$\varphi_L(t) = \varphi_S(t - \tau_{TX\,path} - \tau_{RX\,path}) + \varphi_{TX\,RF\,LO}(t - \tau_{TX\,path} - \tau_{RX\,path}) - \varphi_{RX\,RF\,LO}(t - \tau_{RX\,path}). \quad \text{[Equation 3]}$$

$$\varphi_{T,k}(t) = \varphi_S(t - \tau_{TX\,path} - \tau_{RX\,path} - \tau_{T,k}) + \varphi_{TX\,RF\,LO}(t - \tau_{TX\,path} - \tau_{RX\,path} - \tau_{T,k}) - \varphi_{RX\,RF\,LO}(t - \tau_{RX\,path}). \quad \text{[Equation 4]}$$

The mixer 1230 for beat signal generation may multiply Equation 1 above by Equation 2 above to output a beat signal to an IF port. Because sum-terms among results of the trigonometric function product is easily filtered, when disregarding it and considering only difference-terms, the beat signal may be represented as Equation 5 below.

$$x(t) = x_{IF\,leakage}(t) + x_{IF\,targets}(t) = \quad \text{[Equation 5]}$$

$$\frac{A_S A_L}{2} \cos\left(2\pi(\underbrace{f_{TX} - f_{RX}}_{f_{IF\,carrier}} + \underbrace{\frac{\alpha\tau_{int.}}{f_{beat\,leakage}}}_{f_{IF\,beat\,leakage}})t + \theta_{IF\,leakage'} + \varphi_{IF\,leakage'}(t)\right) + \sum_{k=1}^{K} \frac{A_S A_{T,k}}{2}$$

$$\cos\left(2\pi(\underbrace{f_{TX} - f_{RX}}_{f_{IF\,carrier}} + \underbrace{\frac{\alpha\tau_{int.}}{f_{beat\,leakage}}}_{f_{IF\,beat\,leakage'}} + \underbrace{\frac{\alpha\tau_{T,k}}{f_{beat\,targets,k}}}_{f_{IF\,beat\,targets',k}})t + \theta_{IF\,targets',k} + \varphi_{IF\,targets',k}(t)\right).$$

$\theta_{IF\ leakage'}$ and $\theta_{IF\ leakage',k}$ are the phase of the leakage signal as the IF beat signal and the phase of the signals of the targets. $\tau_{int}$ denotes the total internal delay and may be represented as Equation 6 below.

$$\tau_{int.} = \tau_{TX\ path} + \tau_{RX\ path} - \tau_{LO\ path}.$$  [Equation 6]

The phase noise of the leakage signal as the IF beat signal and the phase noise of the signals of the targets, $\varphi_{IF\ leakage'}(t)$ and $\varphi_{IF\ leakage',k}(t)$ may be represented as Equation 7 below and Equation 8 below, respectively.

$$\varphi_{IF\ leakage'}(t) = \varphi_S(t - \tau_{LO\ path}) - \varphi_L(t).$$  [Equation 7]

$$\varphi_{IF\ targets',k}(t) = \varphi_S(t - \tau_{LO\ path}) - \varphi_{T,k}(t).$$  [Equation 8]

Seeing Equation 5 above, when the leakage signal is finally the beat signal, it may be seen that the beat frequency $f_{beat\ leakage}$ comes from the total internal delay $\tau_{int}$. It is verified that the beat frequency $f_{beat\ leakage}$ is added to the real beat frequency $f_{beat\ targets,k}$ which comes from the delay $\tau_{T,k}$ by the targets to cause an offset to the beat frequency of the target signals. This causes the occurrence of the distance error when a data processing stage 1262 calculates distances from the targets, for the common FMCW radar to which an embodiment of the inventive concept is not applied.

Next, an RX IF stage 1240 capable of including an isolator, an LO, a mixer, a filter, an amplifier, a cable, or the like may introduce an I/Q mixer rather than the common mixer to perform quadrature demodulation. The output signals $y_I(t)$ and $y_Q(t)$ as a result of the quadrature demodulation, for example, the in-phase signal and the quadrature signal may be represented as Equation 9 below and Equation 10 below.

$$y_I(t) = DC_I + \underbrace{A_{IF\ leakage}\cos(2\pi f_{IF\ beat\ leakage}t + \theta_{IF\ leakage} + \varphi_{IF\ leakage}(t))}_{Leakage}$$ [Equation 9]

$$+ \underbrace{\sum_{k=1}^{K} A_{IF\ targets,k}\cos(2\pi(f_{IF\ beat\ leakage} + f_{beat\ targets,k})t + \theta_{IF\ targets,k} + \varphi_{IF\ targets,k}(t))}_{Targets}.$$

$$y_Q(t) = DC_Q + \underbrace{A_{IF\ leakage}A_E \sin(2\pi f_{IF\ beat\ leakage}t + \theta_{IF\ leakage} + \theta_E + \varphi_{IF\ leakage}(t))}_{Leakage}$$ [Equation 10]

$$+ \underbrace{\sum_{k=1}^{K} A_{IF\ targets,k}A_E \sin(2\pi(f_{IF\ beat\ leakage} + f_{beat\ targets,k})t + \theta_{IF\ targets,k} + \theta_E + \varphi_{IF\ targets,k}(t))}_{Targets}.$$

Herein, $A_{IF\ leakage}$ and $A_{IF\ targets,k}$, $\theta_{IF\ leakage}$ and $\theta_{IF\ targets,k}$, and $\varphi_{IF\ leakage}(t)$ and $\varphi_{IF\ leakage,k}(t)$ denote the amplitudes, the phases, and the phase noises of the leakage signal as the beat signal passing through the RX IF stage 1240 and the target signals, $A_E$ and $\theta_E$ denote the I/Q imbalance of the amplitude and the phase, which occurs through quadrature demodulation using the analog I/Q mixer, and $f_{IF\ beat\ leakage}$ denotes the frequency as a result of mixing the $f_{IF\ beat\ leakage'}$ value with the carrier frequency value of the LO in the RX IF stage 1240.

Unlike an SPC technique, because a strategic frequency design is required in an embodiment of the inventive concept, the $f_{IF\ beat\ leakage}$ value may be determined by freely selecting and adjusting the initial carrier frequency of the LFM signal or carrier frequency values of all of LOs in the system at the disposal of the designer.

With regard to the maximum detection distance, when analog to digital converters 1250a and 1250b perform sampling to the minimum available sampling frequency Fs according to the Nyquist sampling theorem, Equation 9 above and Equation 10 above may be represented as Equation 11 below and Equation 12 below.

$$y_I[n] = DC_I + \underbrace{A_{IF\ leakage}\cos(2\pi f_{IF\ beat\ leakage}nT_S + \theta_{IF\ leakage} + \varphi_{IF\ leakage}(nT_S))}_{Leakage}$$ [Equation 11]

$$+ \underbrace{\sum_{k=1}^{K} A_{IF\ targets,k}\cos(2\pi(f_{IF\ beat\ leakage} + f_{beat\ targets,k})nT_S + \theta_{IF\ targets,k} + \varphi_{IF\ targets,k}(t))}_{Targets}.$$

$$y_Q[n] = \underbrace{DC_Q + A_{IF\ leakage}A_E\ \sin(2\pi f_{IF\ beat\ leakage}nT_S + \theta_{IF\ leakage} + \theta_E + \varphi_{IF\ leakage}(nT_S))}_{\text{Leakage}}$$ [Equation 12]

$$+ \underbrace{\sum_{k=1}^{K} A_{IF\ targets,k}A_E\ \sin(2\pi(f_{IF\ beat\ leakage} + f_{beat\ targets,k})nT_S + \theta_{IF\ targets,k} + \theta_E + \varphi_{IF\ targets,k}(nT_S))}_{\text{Targets}}.$$

$y_I[n]$ and $y_Q[n]$ may be input to a digital signal processing stage 1260, may pass through a leakage signal attenuation stage 1261, and may pass through signal processing suitable for radar purposes at a data processing stage 1262.

The leakage signal attenuation stage 1261 will be described with reference to FIG. 3. Herein, FIG. 3 is also applicable to a leakage signal attenuation stage 2261 of FIG. 2, which will be described below. FIG. 3 is a drawing illustrating a configuration of an embodiment for the leakage signal attenuation stage shown in FIGS. 1 and 2. As shown in FIG. 3, the large power of the leakage signal is a problem in the leakage signal attenuation stage 300, but the leakage signal attenuation stage 300 may make a good use of such a problem when extracting (330) frequency and phase information of the leakage signal. First of all, in operation 310, $y_I[n]$ and $y_Q[n]$ may be generated as the complex signal $y_e[n]$. Herein, $y_e[n]$ may be represented as Equation 13 below.

y[n] In operation 331, Y[k] may be obtained through NFFT-point fast Fourier transform (FFT) accompanied with zero padding suitable for y[n] to obtain a spectrum in the form of magnitude response and the $k_{IF\ leakage}$ of the leakage signal as the beat signal at the IF stage may be found using peak searching in the entire frequency domain range $(0 < k < F_S)$.

In this case, NFFT denotes the sum of the number of the real samples and the number of the inserted zero-pads.

Because the level of the leakage signal is highest, $k_{IF\ leakage}$ may be found through the peak searching process. In operation 333, the entire beat frequency value $f_{IF\ beat\ leakage}$ of the leakage signal at the IF stage may be extracted by substituting the found $k_{IF\ leakage}$ into Equation shown in reference numeral 332, and the phase value $\theta_{IF\ leakage}$ may be extracted by substituting $k_{IF\ leakage}$ into the $$y_e[n] = DC_I + jDC_Q + \underbrace{A_{IF\ leakage}\{\cos(2\pi f_{IF\ beat\ leakage}nT_S + \theta_{IF\ leakage} + \varphi_{IF\ leakage}(nT_S))}_{\text{Leakage}}$$ [Equation 13]

$$\underbrace{+ jA_E\ \sin(2\pi f_{IF\ beat\ leakage}nT_S + \theta_{IF\ leakage} + \theta_E + \varphi_{IF\ leakage}(nT_S))\}}_{\text{Leakage}}$$

$$+ \underbrace{\sum_{k=1}^{K} A_{IF\ targets,k}\{\cos(2\pi(f_{IF\ beat\ leakage} + f_{beat\ targets,k})nT_S + \theta_{IF\ targets,k} + \varphi_{IF\ targets,k}(nT_S))}_{\text{Targets}}$$

$$\underbrace{+ jA_E\ \sin(2\pi(f_{IF\ beat\ leakage} + f_{beat\ targets,k})nT_S + \theta_{IF\ targets,k} + \theta_E + \varphi_{IF\ targets,k}(nT_S))\}}_{\text{Targets}}$$

In operation 320, y[n] may be extracted by performing DC removal and I/Q imbalance correction. By performing the I/Q imbalance correction, an I/Q unbalance problem which occurs through quadrature demodulation using the analog I/Q mixer may be addressed. Herein, y[n] may be represented as Equation 14 below.

phase response of Y[k]. In operation 340, a digital numerically controlled oscillator (NCO) in the form of a complex signal having the beat frequency value $f_{IF\ beat\ leakage}$ and the phase value $\theta_{IF\ leakage}$ may be generated using the entire beat frequency value $f_{IF\ beat\ leakage}$ and the phase value $\theta_{IF\ leakage}$ of the leakage signal at the IF stage, which are extracted in $$y[n] = \underbrace{A_{IF\ leakage}\ \exp\{j(2\pi f_{IF\ beat\ leakage}nT_S + \theta_{IF\ leakage} + \varphi_{IF\ leakage}(nT_S))\}}_{\text{Leakage}}$$ [Equation 14]

$$+ \underbrace{\sum_{k=1}^{K} A_{IF\ targets,k}\ \exp\{j((2\pi(f_{IF\ beat\ leakage} + f_{beat\ targets,k})nT_S + \theta_{IF\ targets,k} + \varphi_{IF\ targets,k}(nT_S))\}}_{\text{Targets}}.$$

reference numerals 332 and 333. In this case, the generated digital NCO may be represented as Equation 15 below.

$$NCO[n] = e^{j(2\pi f_{IF\ beat\ leakage} nT_S + \theta_{IF\ leakage})} \quad \text{[Equation 15]}$$

The final down-conversion may be implemented by taking (350) a complex conjugate to it and multiplying (360) the complex conjugate by y[n], and only a real part may be obtained in operation 370. Thus, the output z[n] may be represented as Equation 16 below.

The following operations are the same as those described with reference to FIG. 1. In other words, with regard to the maximum detection distance, ADCs 2250a and 2250b may perform sampling using the maximum available sampling frequency Fs according to the Nyquist sampling theorem. $y_I$ [n] And $y_Q$ [n] may be input to a digital signal processing stage 2260, may pass through a leakage signal attenuation stage 2261, and may pass through signal processing suitable for radar purposes at a data processing stage 2262.

$$z[n] = \underbrace{A_{IF\ leakage}\ \cos(\varphi_{IF\ leakage}(nT_S))}_{Leakage} + \underbrace{\sum_{k=1}^{K} A_{IF\ targets,k}\ \cos(2\pi f_{beat\ targets,k} nT_S + \theta_{targets,k} + \varphi_{IF\ targets,k}(nT_S))}_{Targets}. \quad \text{[Equation 16]}$$

Herein, it means that $\theta_{target,k} = \theta_{IF\ target,k} - \theta_{IF\ leakage}$.

Thus, the phase noise of the leakage signal is concentrated at the phase point when the domain is "0" in the cosine function, that is, the stationary point, and the level of the phase noise indicated as the voltage or current noise may be considerably mitigated.

Figure 2:
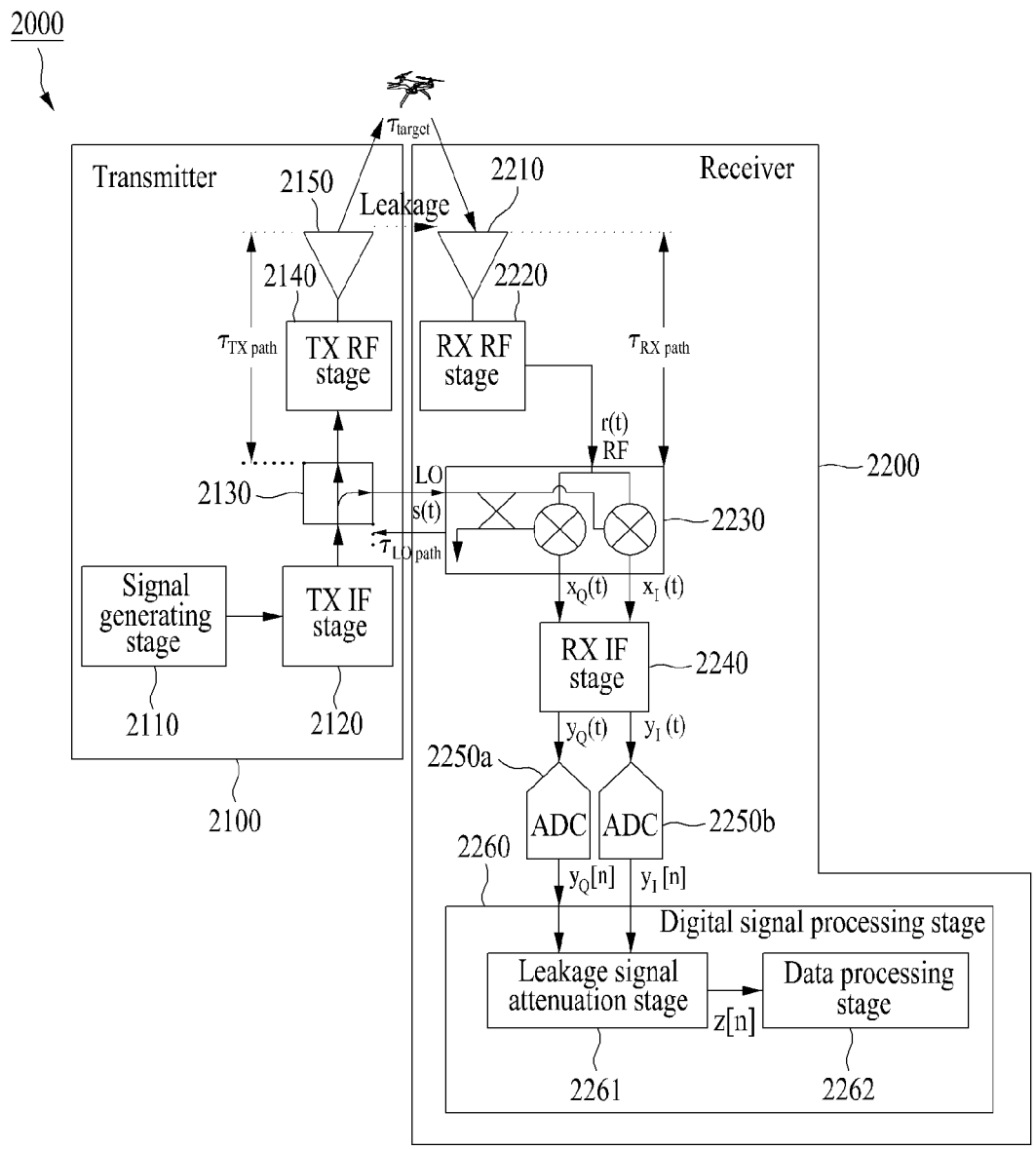
FIG. 2 is a drawing illustrating a configuration of an FMCW radar system according to another embodiment of the inventive concept.
Figure 3:
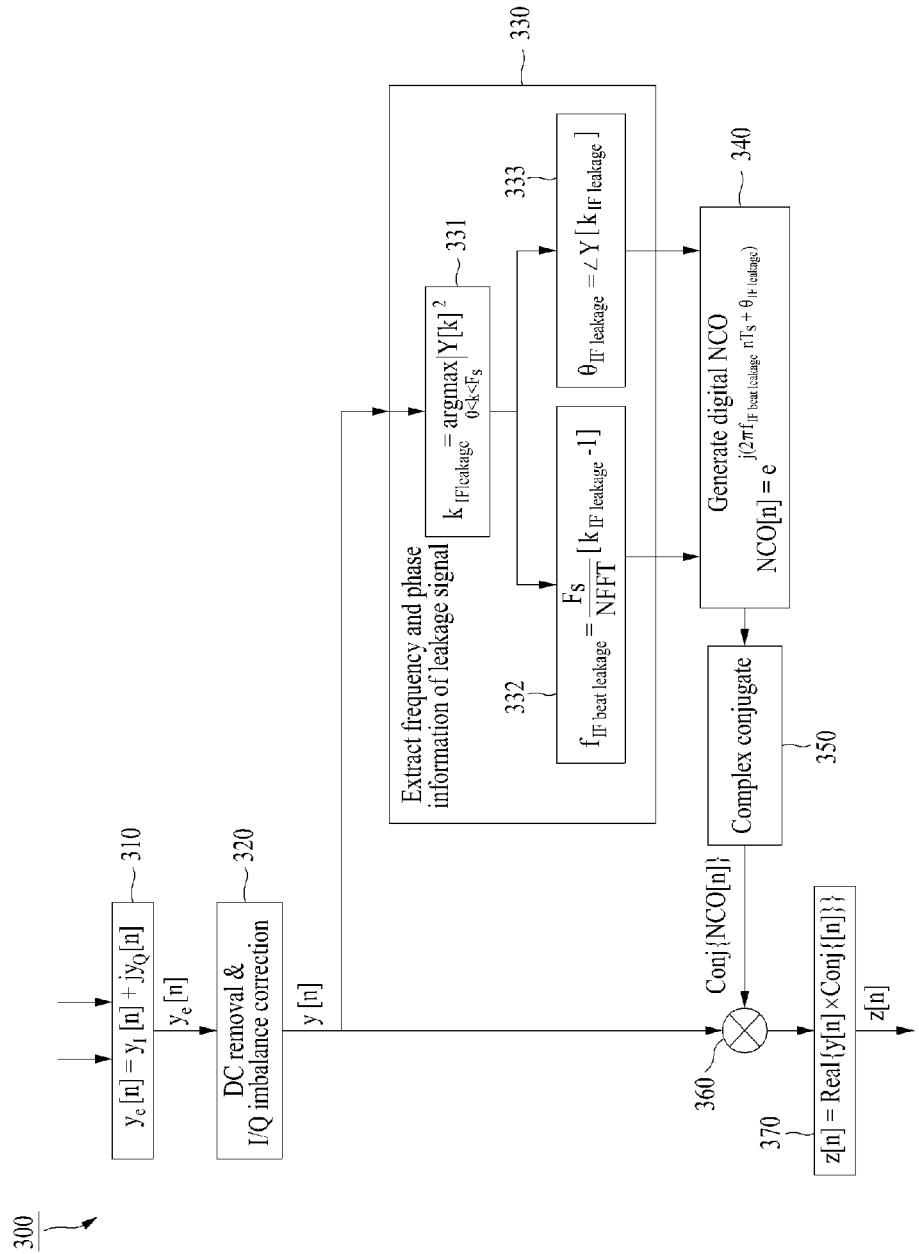
FIG. 3 is a drawing illustrating a configuration of an embodiment for a leakage signal attenuation stage shown in FIGS. 1 and 2.

FIG. 2 is a drawing illustrating a configuration of an FMCW radar system according to another embodiment of the inventive concept, which illustrates a block diagram of the entire FMCW radar system of another structure to which an A-SPC technique is applied.

As shown in FIG. 2, the overall flow of the FMCW radar system according to another embodiment of the inventive concept is shown in FIG. 1, but an I/Q mixer is introduced as a mixer 2230 for beat signal generation. An initial carrier frequency of the LFM signal capable of being controlled by a signal generating stage 2110 and a carrier frequency of the LO capable of being present in a TX IF stage 2120, a TX RF stage 2140, or an RX RF stage 2220 may be freely adjusted to determine the carrier frequency $f_{IF\ carrier}$ included in the IF beat signal to be any value suitable for the intention of the designer. Furthermore, the mixer 2230 for beat signal generation may perform direct conversion by removing an LO and a mixer from the RX RF stage 2220, such that a value of $f_{IF\ carrier}$ becomes "0". In the latter case, because a range correlation effect occurs when the LO and the mixer are removed from the RX IF stage 2240, the form of phase noise may be varied. Thus, as shown in FIG. 7, the form of the noise floor may also be varied. Signals output from the mixer 2230 for beat signal generation may be represented as Equation 17 below and Equation 18 below.

Herein, a carrier frequency of the LO in an RX IF stage 2240 may be freely selected, and an LO and a mixer may be removed altogether to have the relationship of $f_{IF\ beat\ leakage'} = f_{IF\ beat\ leakage}$.

Figure 4:
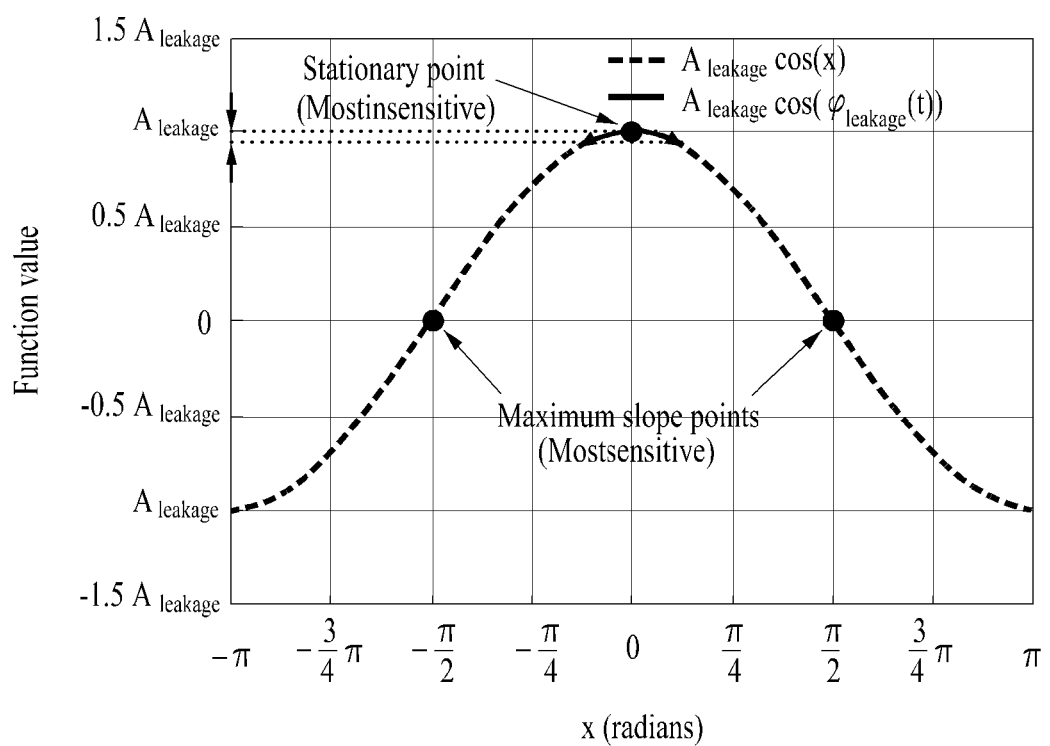
FIG. 4 is a drawing illustrating an example for describing the concept of a stationary point concentration (SPC) technique.

FIG. 4 is a drawing illustrating an example for describing the concept of the SPC technique. The concept of the SPC may be interpreted with reference to FIG. 4 with regard to the real situation which does not take small angle approximation.

As shown in FIG. 4, for the common FMCW radar to which an SPC technique or an A-SPC technique according to an embodiment of the inventive concept are not applied, the phase noise of the leakage signal may tremble at all points, including the most sensitive points (the maximum slope points), on the graph drawn with the block solid line of FIG. 4. On the other hand, by applying an embodiment of the inventive concept, the phase noise of the leakage signal may be concentrated and tremble on only the stationary point on the graph drawn with the black sold line of FIG. 4. Thus, the magnitude of the phase noise indicated as voltage or current may be more significantly reduced than the common method. Thus, the noise floor may be considerably reduced and, as a result, the SNR of the target signals may be significantly improved.

Figure 5A:
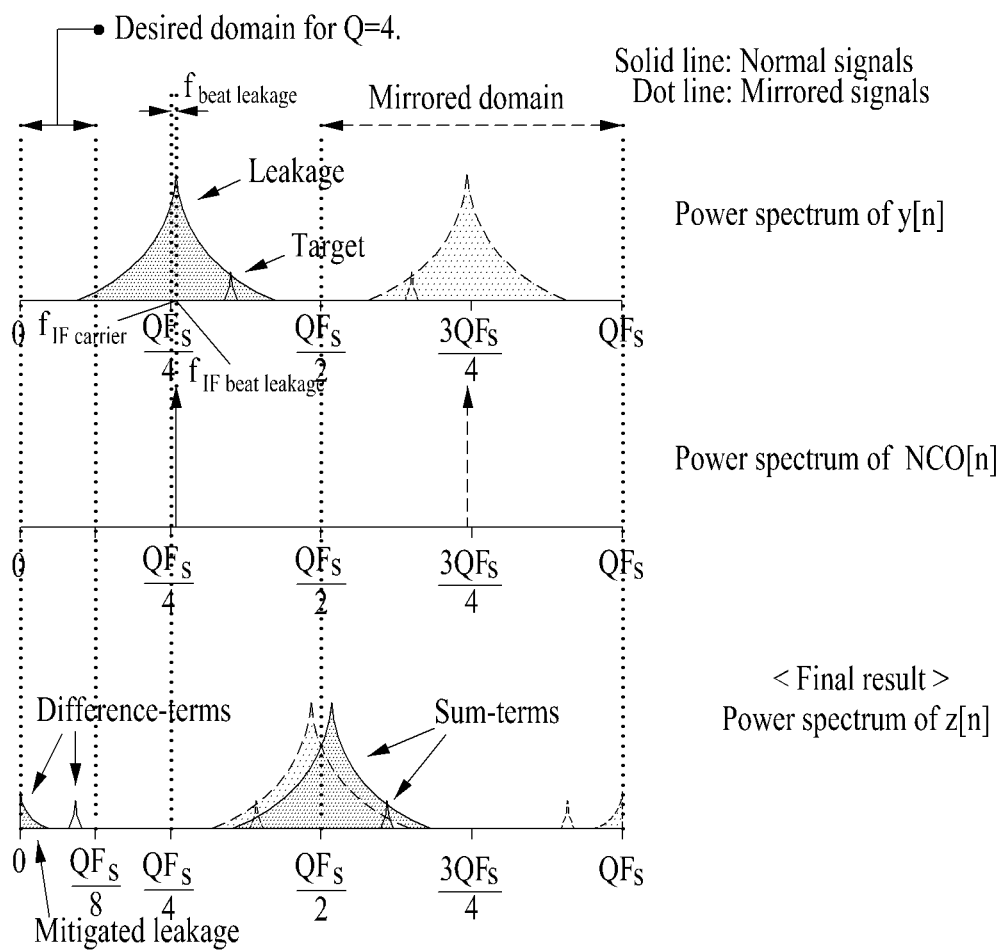
FIGS. 5A and 5B are drawings illustrating an example of showing a process of implementing an SPC technique and a method according to an embodiment of the inventive concept as a power spectrum.
Figure 5B:
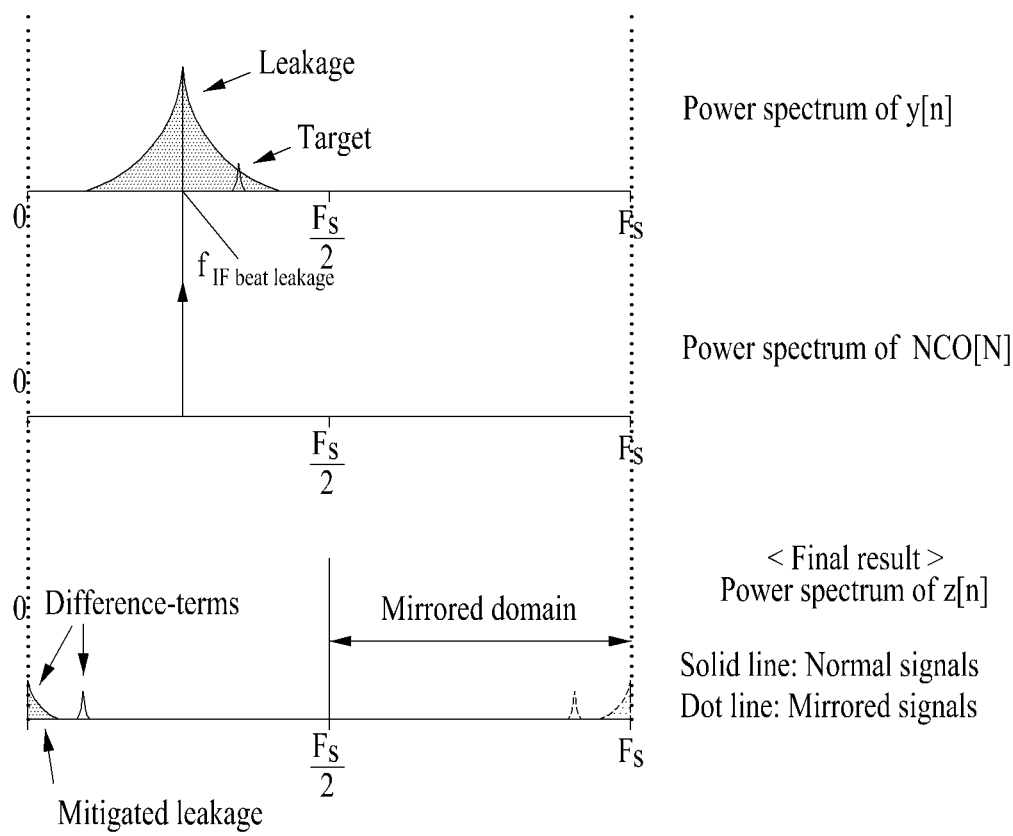

FIGS. 5A and 5B are drawings illustrating an example of showing a process of implementing an SPC technique and a method according to an embodiment of the inventive concept as a power spectrum.

As shown in FIG. 5A, the SPC technique should perform sampling to the oversampling frequency QFs by multiplying the minimum available sampling frequency Fs according to $$x_I(t) = DC_I + \underbrace{\frac{A_S A_L}{2} \cos(2\pi\ f_{IF\ beat\ leakage'} \cdot t + \theta_{IF\ leakage'} + \varphi_{IF\ leakage'}(t))}_{Leakage} \quad \text{[Equation 17]}$$

$$+ \underbrace{\sum_{k=1}^{K} \frac{A_S A_{T,k}}{2} \cos(2\pi(f_{IF\ beat\ leakage'} + f_{beat\ targets,k})t + \theta_{IF\ targets',k} + \varphi_{IF\ targets,k}(t))}_{Targets}.$$

$$x_Q(t) = DC_Q + \underbrace{\frac{A_S A_L}{2} A_E \sin(2\pi f_{IF\ beat\ leakage'} \cdot t + \theta_{IF\ leakage'} + \theta_E + \varphi_{IF\ leakage'}(t))}_{Leakage} \quad \text{[Equation 18]}$$

$$+ \underbrace{\sum_{k=1}^{K} \frac{A_S A_{T,k}}{2} A_E \sin(2\pi(f_{IF\ beat\ leakage'} + f_{beat\ targets,k})t + \theta_{IF\ targets',k} + \theta_E + \varphi_{IF\ targets',k}(t))}_{Targets}.$$

the Nyquist sampling theorem by the constant Q which is a suitable positive rational number value. Furthermore, the strategic frequency planning for designing the FMCW radar system such that $f_{IF\ beat\ leakage}$ is located near $QF_s(4N+1)/4$ in the frequency domain is required. In this case, N may be 0 or a natural number. In other words, by designing the FMCW radar through the strategic frequency planning in FIG. 5, the sum-terms which are the undesired terms as a result of performing the last multiplication of the oversampled beat signals and the digital NCO may be as far away as from the difference-terms which the desired terms. Furthermore, because the sum-terms which are the undesired terms are located in the center of the frequency domain, if the designer wants it, the sum-terms may be clearly removed through the digital low pass filter.

On the other hand, as shown in FIG. 5B, the A-SPC technique according to an embodiment of the inventive concept may obtain an SPC effect without the oversampling and the strategic frequency planning. Furthermore, the sub-terms may be basically removed.

Figure 6A:
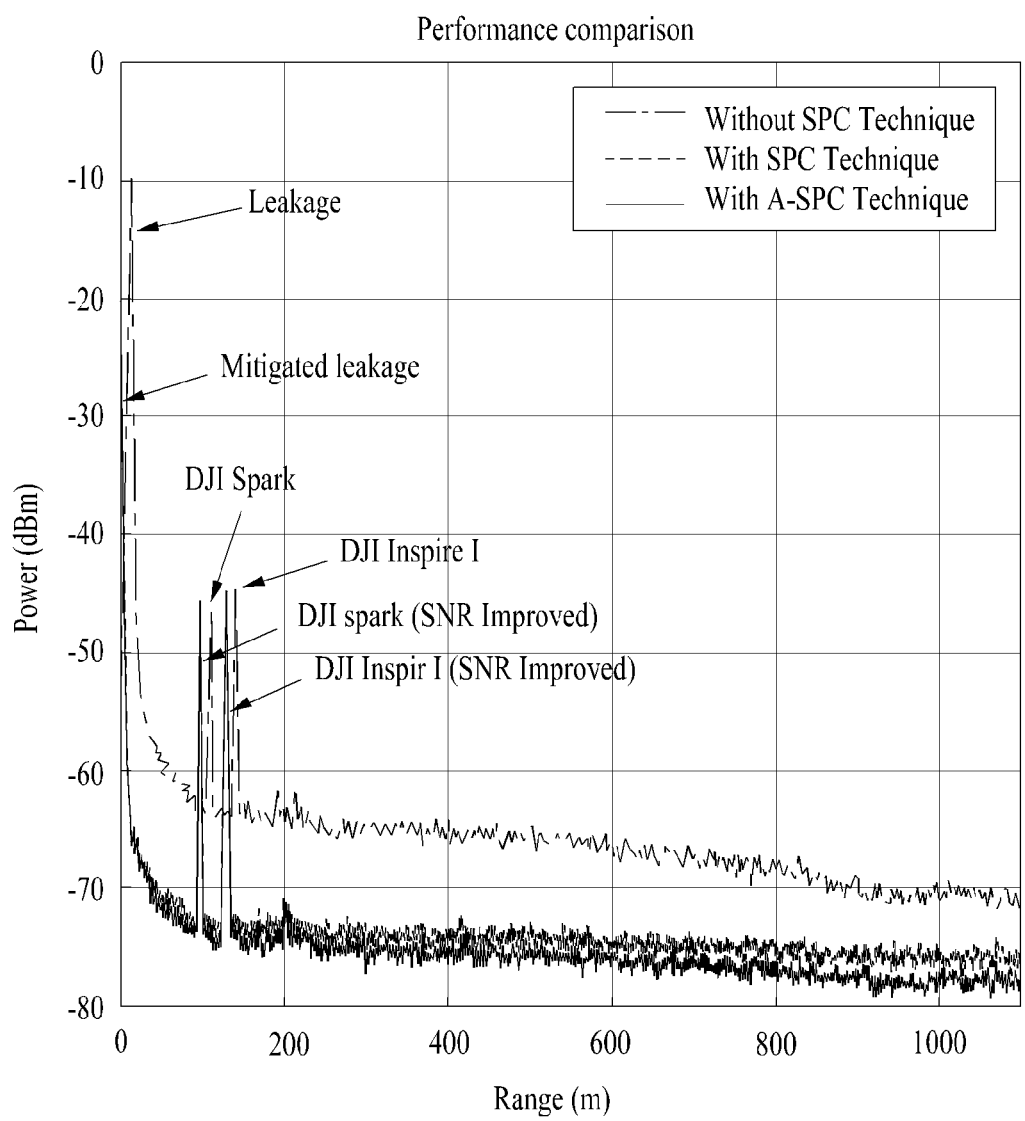
FIGS. 6A and 6B are drawings illustrating an example of comparing average power spectrum results for an SPC technique and a method according to an embodiment of the inventive concept in a situation where there are a leakage signal and target signals.
Figure 6B:
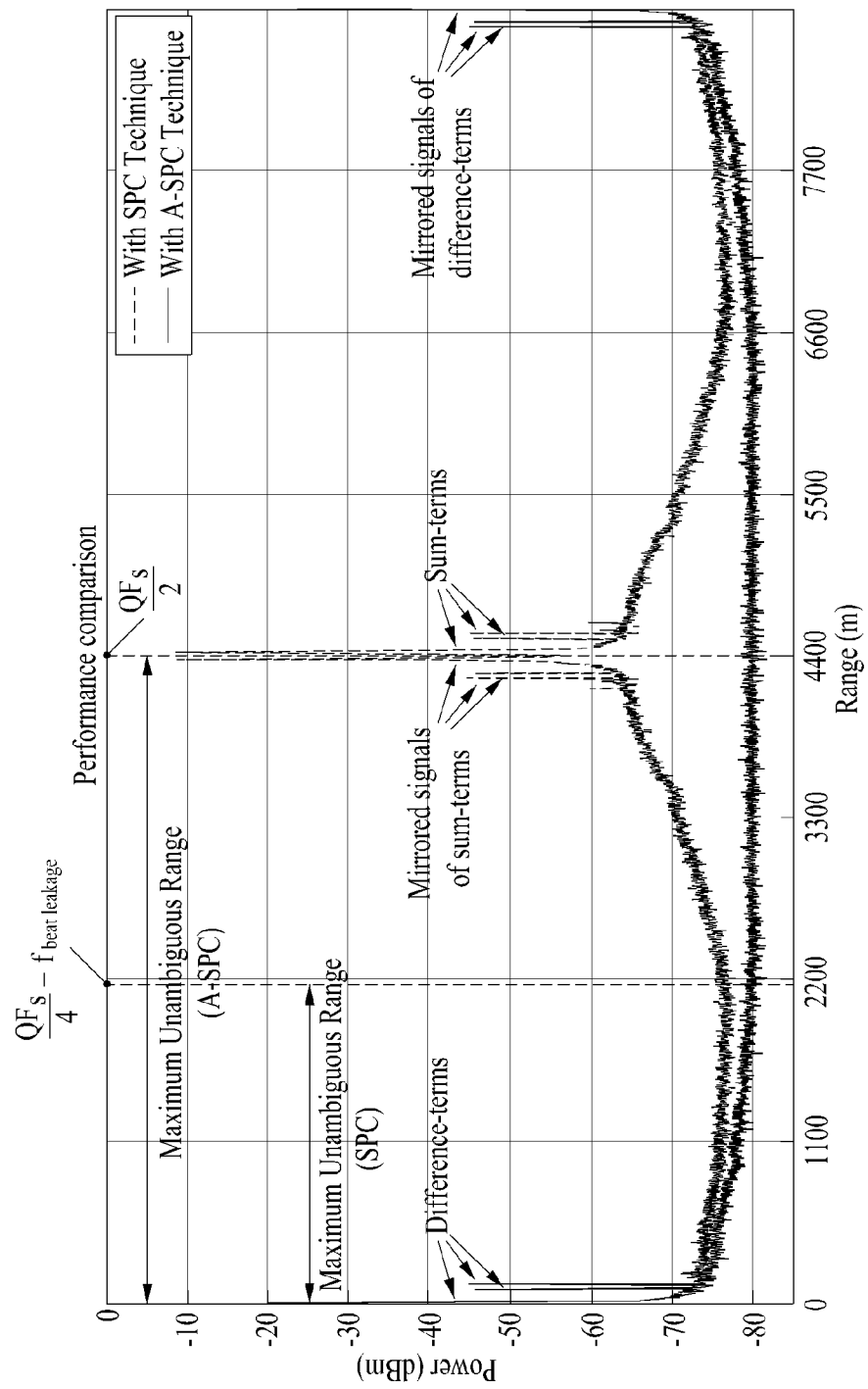

FIGS. 6A and 6B are drawings illustrating an example of comparing average power spectrum results for an SPC technique and a method according to an embodiment of the inventive concept in a situation where there are a leakage signal and target signals. FIG. 6A is a drawing illustrating an example of comparing average power spectrum results for an SPC technique and a method according to an embodiment of the inventive concept in a partial frequency domain range when any technique is not applied, in a situation where there is a leakage signal and target signals. FIG. 6B is a drawing illustrating an example of comparing average power spectrum results for an SPC technique and a method according to an embodiment of the inventive concept in the entire frequency domain range, in a situation where there is a leakage signal and target signals.

Herein, FIGS. 6A and 6B illustrate the results obtained by actually constructing the radar system which comes from an embodiment of the inventive concept and conducting the experiment, which illustrates a comparison by using the latest drones of DJI, Spark and Inspire I, as targets.

FIG. 6A is a comparison of the average power spectrum without the SPC technique, the average power spectrum with the SPC technique, and the average power spectrum with the A-SPC technique, thus taking an average of 100 power spectrum results for a clear comparison to reduce a dispersion degree of the noise floor. FIG. 6A is a comparison of average power spectrum results in the desired frequency domain portion when considering the SPC technique. As shown in FIG. 6A, it may be verified that the noise floor is more significantly reduced in the average power spectrum with the SPC technique and the A-SPC technique than that in the average power spectrum without the SPC technique. Furthermore, it may be seen that the SNR of target signals is very enhanced. It may be seen that the noise floor and the SNR of the target signals with the A-SPC technique according to an embodiment of the inventive concept are more improved than those without the SPC technique.

FIG. 6B illustrates the result of applying the oversampling frequency required in the SPC technique although the oversampling is not needed in applying the A-SPC technique, which illustrates a comparison of all domains. As shown in FIG. 6B, it may be seen that the phase noise of the sum-terms has an influence on the difference-terms which the desired signals in the result of the average spectrum with the SPC technique. Digital filtering may be applied to remove the sum-terms, but the phase noise of the sum-terms is not removed. On the other hand, it may be seen that there is no sum-terms themselves which is a problem in the result of the average spectrum with the A-SPC technique according to an embodiment of the inventive concept. This is because the noise floor and the SNR of the target signals with the A-SPC technique according to an embodiment of the inventive concept are more improved than those with the SPC technique. Furthermore, in FIG. 6B, it may be seen that the maximum unambiguous range in the result of the average spectrum with the A-SPC technique according to an embodiment of the inventive concept is over two times than that in the result of the average spectrum with the SPC technique.

Figure 7A:
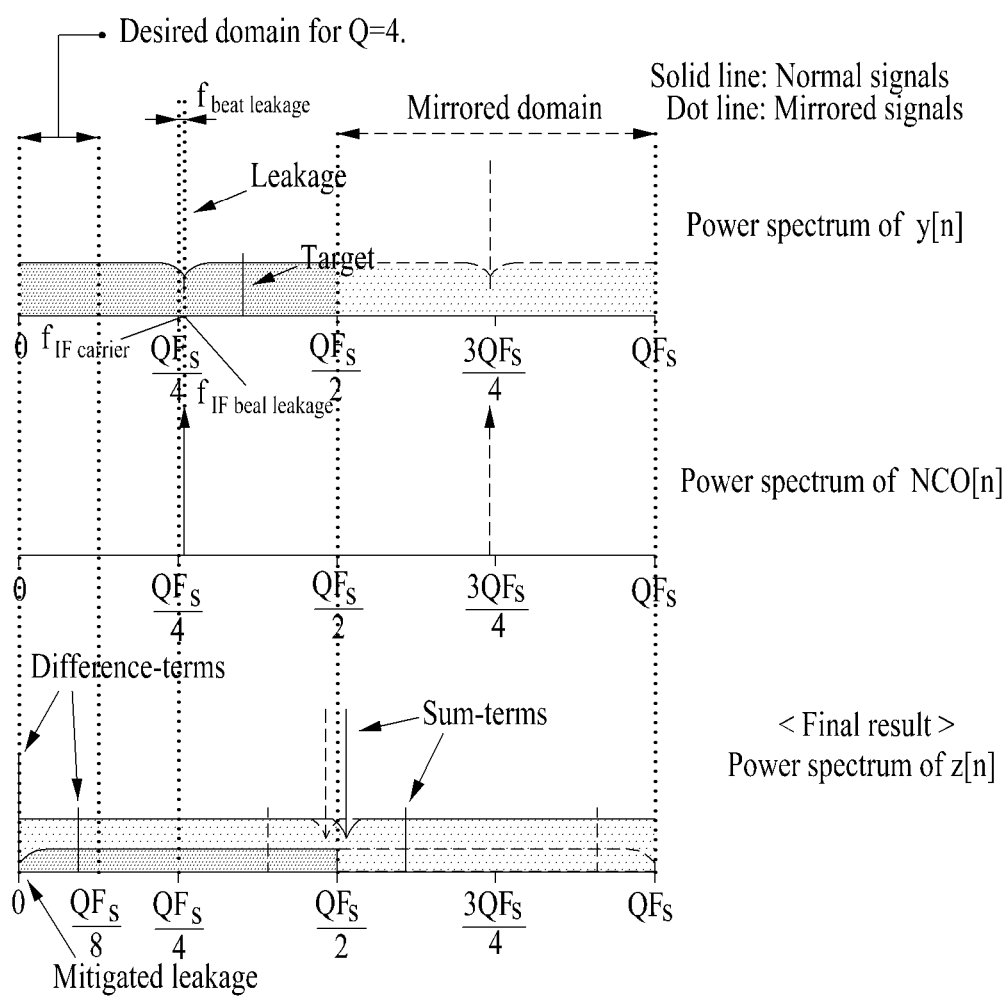
FIGS. 7A and 7B are drawings illustrating an example of comparing power spectra for an SPC technique and a method according to an embodiment of the inventive concept in an FMCW radar having a radar system structure in which a range correlation effect occurs.
Figure 7B:
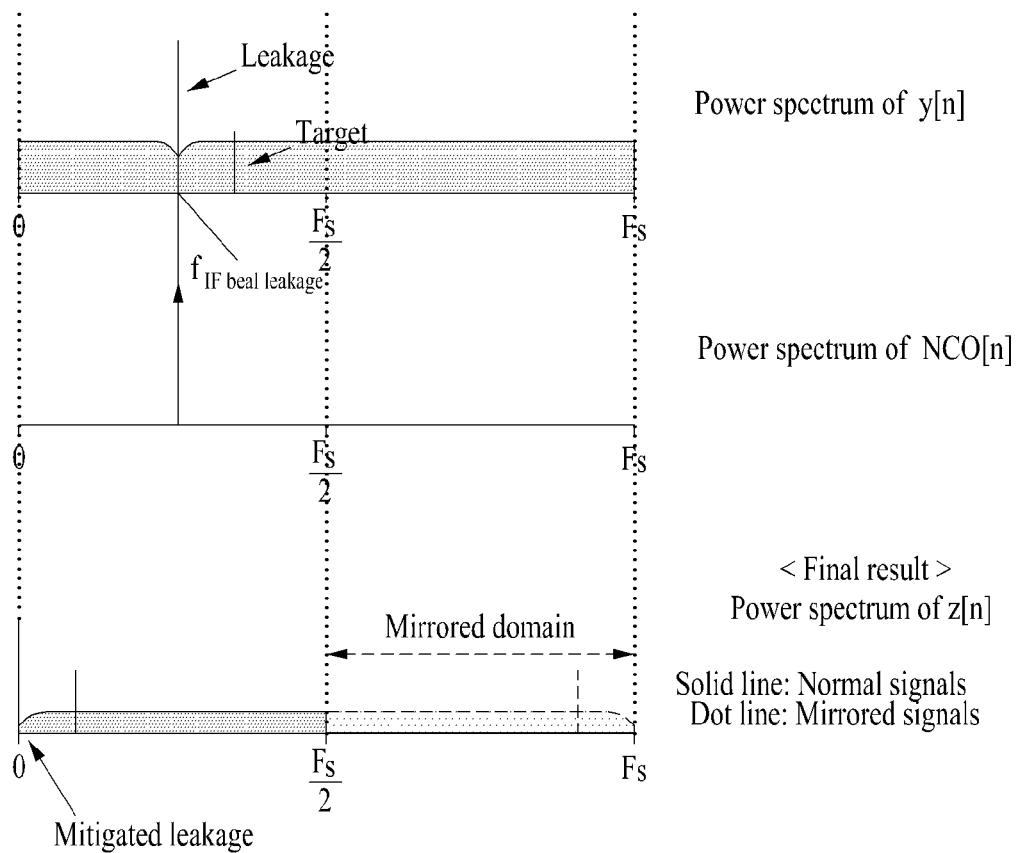

FIGS. 7A and 7B are drawings illustrating an example of comparing power spectra for an SPC technique and a method according to an embodiment of the inventive concept in an FMCW radar having a radar system structure in which a range correlation effect occurs.

Herein, the FMCW radar structure in which the range correlation effect occurs is described in the description of FIG. 2.

As shown in FIG. 7A, it is shown that the SPC technique does not obtain the effect of mitigating the noise floor and improving the SNR due to the noise floor which comes from the phase noise of the sum-terms. On the other hand, as shown in FIG. 7B, it may be seen that the A-SPC technique according to an embodiment of the inventive concept may obtain the effect of mitigating the noise floor and improving the SNR.

As may be seen from FIGS. 5 and 7, the A-SPC technique according to an embodiment of the inventive concept may implement the SPC effect irrespective of the FMCW radar structure, thus considerably mitigating the noise floor over the overall frequency (or distance) domain and greatly improving the SNR.

As such, the system according to embodiments of the inventive concept may mitigate the leakage signal which is a unique problem which occurs in the FMCW radar to reduce the noise floor in the power spectrum over the overall frequency domain, thus improving the SNR of the target signal.

Furthermore, the system according to embodiments of the inventive concept may be free in the frequency planning and may save sampling frequency resources because there is no need for the strategic frequency planning and the oversampling required in the SPC technique. Furthermore, the A-SPC technique according to an embodiment of the inventive concept may more improve the noise floor and the SNR of the target signals than the SPC technique and may ensure the maximum unambiguous range over two times when performing sampling to the same extent as the oversampling frequency required in the SPC technique. Thus, unlike the SPC technique, the A-SPC technique according to an embodiment of the inventive concept may be applied irrespective of the FMCW radar structure. In other words, the SPC technique has a limit in an applicable FMCW radar structure, whereas the A-SPC technique according to an embodiment of the inventive concept may be applied irrespective of the FMCW radar structure.

Furthermore, the system according to embodiments of the inventive concept may implement quadrature demodulation by introducing the FQ mixer, may sample the resulting in-phase (I) and quadrature (Q) beat signals to be generated in the form of a complex signal, may perform DC removal and I/Q imbalance correction to generate a complex signal, and may mitigate the leakage signal which is a unique problem which occurs in the FMCW radar through the SPC technique using the generated complex signal.

Figure 8:
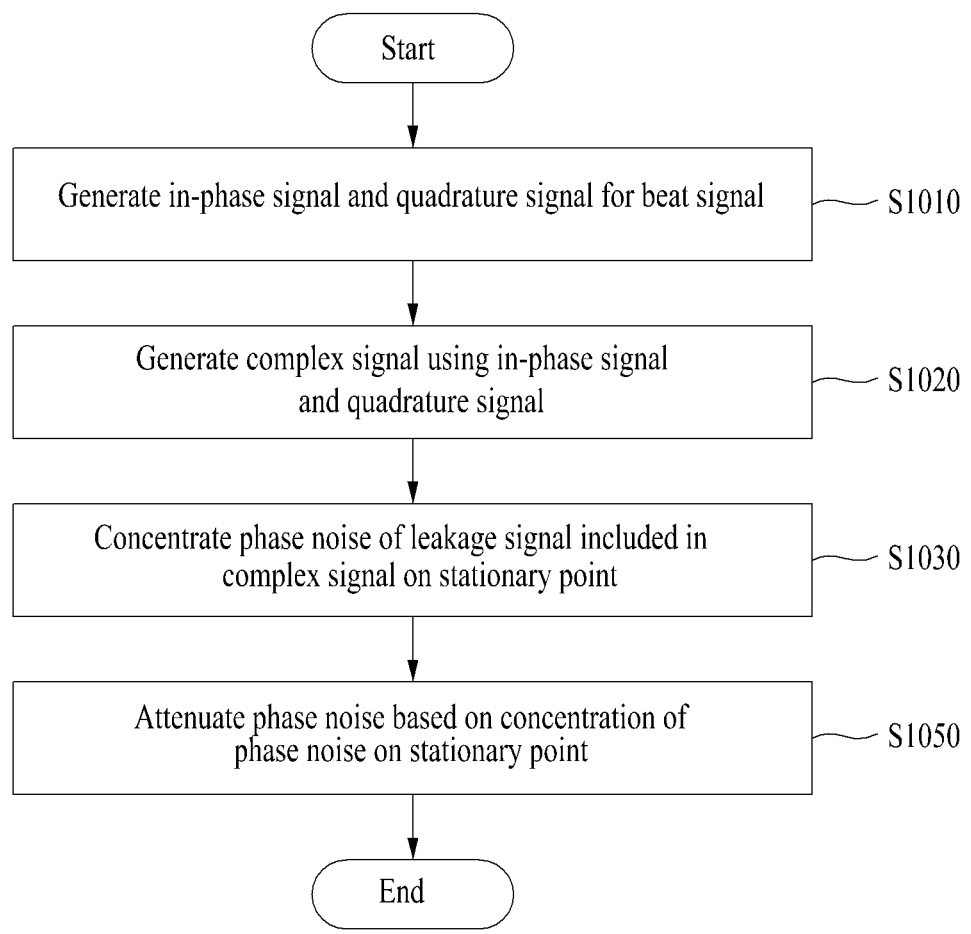
FIG. 8 is an operational flowchart illustrating a method for mitigating a leakage signal according to an embodiment of the inventive concept.

FIG. 8 is an operational flowchart illustrating a method for mitigating a leakage signal according to an embodiment of the inventive concept, which illustrates an operational flowchart in the system of FIGS. 1 to 7B.

Referring to FIG. 8, in a method for mitigating a leakage signal in an FMCW radar system according to an embodiment of the inventive concept, in operations S810 and S820, the FMCW radar system may generate an I signal and a Q signal for a beat signal and may generate a complex signal using the generated I signal and the generated Q signal.

When the complex signal is generated in operation S820, in operation S830, the FMCW radar system may concentrate the phase noise of a leakage signal included in the complex signal on a stationary point.

Herein, in operation S830, the FMCW radar system may concentrate the phase noise on the stationary point using an SPC technique of concentrating the phase noise of the leakage signal on the stationary point of the cosine function and may concentrate the phase noise on the stationary point by performing sampling to the minimum available sampling frequency according to the Nyquist Sampling Theorem, with regard to the maximum detection distance without the necessity of oversampling and strategic frequency planning.

In detail, in operation S830, the FMCW radar system may perform DC removal and I/Q imbalance correction for the complex signal to extract a first signal from the complex signal, may perform the fast Fourier transform (FFT) accompanied with the zero padding for the first signal to obtain a spectrum in the form of magnitude response, may find an index of the leakage signal as the beat signal using peak searching, may extract a beat frequency value and a phase value of the leakage signal based on the index of the leakage signal, may generate a digital NCO based on the beat frequency value and the phase value, and may perform down-conversion of removing the beat frequency and the phase of the leakage signal by taking a complex conjugate to the digital NCO and multiplying the complex conjugate by the first signal.

In S840, the FMCW radar system may mitigate the phase noise of the leakage signal based on the phase noise concentrated on the stationary point in operation S830 to mitigate the leakage signal, thus improving the SNR of the target signal.

It is apparent to those skilled in the art that, although the description is omitted in the method of FIG. 8, the respective operations performing FIG. 8 may include all details described in FIGS. 1 to 7B.

The foregoing systems or devices may be realized by hardware elements, software elements and/or combinations thereof. For example, the described systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented in the form of program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments of the inventive concept, the FMCW radar system may mitigate the leakage signal which is a unique problem which occurs in the FMCW radar to reduce the noise floor in the power spectrum over the overall frequency domain, thus improving the SNR of the target signal.

According to embodiments of the inventive concept, the FMCW radar system may be free in the frequency planning and may save sampling frequency resources because there is no need for the strategic frequency planning and the oversampling required in the SPC technique. Furthermore, the FMCW radar system may more improve the noise floor and the SNR of the target signals than the SPC technique and may ensure the maximum unambiguous range over two times when performing sampling to the same extent as the oversampling frequency required in the SPC technique. Unlike the SPC technique, the FMCW radar system may be applied irrespective of the FMCW radar structure. In other words, the SPC technique has a limit in an applicable FMCW radar structure, whereas the A-SPC technique according to an embodiment of the inventive concept may be applied irrespective of the FMCW radar structure.

Because the problem of the leakage signal is a basically inherent problem in the FMCW radar, an embodiment of the inventive concept may be applied in all fields which use the FMCW radar. For example, an embodiment of the inventive concept may be applied to all fields capable of applying the FMCW radar, such as a radar for detecting a static target, a radar for detecting a moving target, a level meter, an altimeter, a radar for detecting a biometric signal, a radar for weather prediction and analysis, or a radar for image detecting (a synthetic aperture radar (SAR) or inverse synthetic aperture radar (ISAR)), as well as a radar for vehicle in an autonomous vehicle, a radar for detecting a small drone, or an SAR.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for mitigating a leakage signal in a radar system, the method comprising:
    transmitting at least one signal via a transmitter;
    receiving at least one reflection via a receiver;
    reducing the leakage signal between the transmitter and receiver, comprising the stepS of:
    generating an in-phase signal and a quadrature signal for a beat signal;
    generating a complex signal using the in-phase signal and the quadrature signal;
    concentrating a phase noise of the leakage signal included in the complex signal on a stationary point; and
    mitigating the phase noise based on stationary point concentration (SPC) of the phase noise;
    wherein the step of concentrating includes extracting a first signal from the complex signal by performing DC removal and in-phase/quadrature imbalance correction for the complex signal;
    obtaining a spectrum in the form of magnitude response after performing fast Fourier transform (FFT) accompanied with zero padding for the first signal and finding an index of the leakage signal using peak searching;
    extracting a beat frequency value of the leakage signal based on the index of the leakage signal;
    extracting a phase value of the leakage signal based on the index of the leakage signal;
    generating a digital numerically controlled oscillator (NCO) based on the extracted beat frequency value and the extracted phase value; and
    performing a down-conversion step by taking a complex conjugate of the digital NCO and multiplying the complex conjugate by the first signal to remove the extracted beat frequency value and the extracted phase value of the leakage signal.

2. The method of claim 1, wherein the concentrating step includes:
    concentrating the phase noise on the stationary point using an SPC technique by concentrating the phase noise of the leakage signal on a stationary point of a cosine function.

3. The method of claim 1, wherein the concentrating step includes:
    concentrating the phase noise of the leakage signal on the stationary point by performing sampling at a minimum sampling frequency according to the Nyquist sampling theorem, with regard to a maximum detection distance without the necessity of oversampling and strategic frequency planning.

4. A radar system for mitigating a leakage signal, the radar system comprising:
    a first means configured to generate an in-phase signal and a quadrature signal for a beat signal;
    a second means configured to generate a complex signal using the in-phase signal and the quadrature signal and concentrate a phase noise of the leakage signal included in the complex signal on a stationary point; and
    a third means configured to mitigate the phase noise based on stationary point concentration (SPC) of the phase noise;
    wherein the second means (i) extracts a first signal from the complex signal by performing DC removal and in-phase/quadrature imbalance correction for the complex signal, (ii) obtains a spectrum in the form of magnitude response after performing fast Fourier transform (FFT) accompanied with zero padding for the first signal and finds an index of the leakage signal using peak searching, (iii) extracts a beat frequency value of the leakage signal based on the index of the leakage signal and extracts a phase value of the leakage signal based on the index of the leakage signal, (iv) generates a digital numerically controlled oscillator (NCO) based on the extracted beat frequency value of the leakage signal and the extracted phase value of the leakage signal, and (v) performs a down-conversion step by taking a complex conjugate of the digital NCO and multiplying the complex conjugate by the first signal to remove the extracted beat frequency value and the extracted phase value of the leakage signal.

5. The radar system of claim 4, wherein the second means concentrates the phase noise on the stationary point using an SPC technique by concentrating the phase noise of the leakage signal on a stationary point of a cosine function.

6. The radar system of claim 4, wherein the second means concentrates the phase noise of the leakage signal on the stationary point by performing sampling at a minimum sampling frequency according to the Nyquist sampling theorem, with regard to a maximum detection distance without the necessity of oversampling and strategic frequency planning.

7. A radar system for removing a beat frequency value and a phase value of a leakage signal, the radar system comprising:
    a transmit (TX) radio frequency (RF) stage;
    a receive (RX) RF stage;
    a TX intermediate frequency (IF) stage;
    a mixer;
    an RX IF stage;
    first and second analog-to-digital converters (ADCs); and
    a leakage signal attenuation stage,
    wherein the first and second ADCs sample an in-phase signal and a quadrature signal for a beat signal output from the RX IF stage to a predetermined frequency, and
    wherein the leakage signal attenuation stage generates a complex signal using the in-phase signal and the complex signal, extracts a first signal from the complex signal by performing DC removal and in-phase/quadrature imbalance correction for the complex signal, extracts a beat frequency value of the leakage signal and a phase value of the leakage signal, and performs a final down-conversion step of generating a digital numerically controlled oscillator (NCO), based on the extracted beat frequency value and the extracted phase value, and multiplying the digital NCO by the first signal.

8. The radar system of claim 7, wherein the leakage signal attenuation stage obtains a spectrum in the form of magnitude response after performing fast Fourier transform (FFT) accompanied with zero padding for the first signal and finds an index of the leakage signal using peak searching, extracts the beat frequency value of the leakage signal based on the index of the leakage signal and extracts the phase value of the leakage signal based on the index of the leakage signal, and performs a down-conversion step by taking a complex conjugate of the digital NCO and multiplying the complex conjugate by the first signal to remove the extracted beat frequency value and the extracted phase value of the leakage signal.

9. The radar system of claim 7, wherein the mixer provides the RX IF stage with an in-phase beat signal and a quadrature beat signal by including an in-phase mixer and a quadrature mixer and performing quadrature demodulation.

* * * * *